Patented June 12, 1928.

1,673,691

UNITED STATES PATENT OFFICE.

FRANS G. LILJENROTH, OF STOCKHOLM, SWEDEN, AND MARKUS LARSSON, OF NIAGARA FALLS, NEW YORK, ASSIGNORS, BY DIRECT AND MESNE ASSIGNMENTS, TO PHOSPHORUS-HYDROGEN COMPANY, A CORPORATION OF MAINE.

METHOD OF PRODUCING HYDROGEN.

No Drawing. Original application filed September 18, 1923, Serial No. 663,493, and in Sweden May 29, 1923. Divided and this application filed May 26, 1925. Serial No. 32,925.

This invention relates to an improved method of producing hydrogen.

It has already been proposed to produce hydrogen by reduction of steam by means of phosphorus at such a temperature that the phosphorus is oxidized essentially to phosphorus pentoxide by means of the oxygen of the water while an equivalent quantity of hydrogen is set free. In said reaction generally some hydrogen phosphide is formed as an injurious by-product and the quantity thereof will be the larger the lower is the reaction temperature. For obtaining a hydrogen gas which is practically free from hydrogen phosphide and for obtaining a sufficient velocity of the reaction it has been found to be necessary to use a temperature of reaction of about 1000° C. or more. The performing of the reaction at such high temperature is however very difficult and it is, therefore, desirable to perform the reaction at a lower temperature while avoiding the formation of hydrogen phosphide in any appreciable quantity.

We have now found that the reduction of steam by means of phosphorus can be essentially facilitated by performing the reaction in the presence of a catalyzer. By the use of a catalyzer for the reaction the reaction temperature can be essentially lowered or the velocity of the reaction be essentially accelerated and, furthermore, the valuable effect is reached that the formation of hydrogen phosphide is practically suppressed. Even if the phosphorus gas used in the process, for instance the gas mixture coming from a reduction furnace for phosphatic rock, contains a considerable percentage of hydrogen phosphide also said hydrogen phosphide becomes completely decomposed by the action of the catalyzer and its content of phosphorus utilized for the reduction of the steam, so that the reduction aimed at can be performed not only by means of elementary phosphorus but also with hydrogen phosphide. By the expression "phosphorus gas" heretofore and hereafter used we mean vaporized phosphorus which may be in a highly heated state as well as hydrides of phosphorus such as hydrogen phosphide, or mixtures of the two in various proportions. For maintaining the reaction temperature the steam may if desired be mixed with a regulated quantity of air or oxygen whereby a minor part of the phosphorus is directly burned to phosphorus pentoxide. If air is added the resulting gas will be a mixture of hydrogen and nitrogen, for instance in such proportions that the gas mixture can be used for the synthetic production of ammonia. The phosphorus pentoxide formed in the reduction of the steam is separated from the gas in any suitable manner, for instance by electrical precipitation or by absorption in water.

We have found that as catalyzers for the reaction aimed at metals and oxides of the metals of the eighth, seventh and sixth groups and the noble and semi-noble metals of the first group of the periodic system may be used. The metals of the eighth group which may be used are Fe, Ni, Co, Ru, Rh, Pd, Os, Ir and Pt, of the seventh group Mn, of the sixth group Cr, Mo, W and U, and of the first group Cu, Ag and Au. The metals or their oxides may be used either as screens (say, like wire gauze) or as powder or deposited in finely divided state on asbestos, pumice or similar carrier. It is not necessary to use the metals or their oxides in pure or unmixed state but the invention comprises also the cases wherein the catalyzer consists of mixtures of two or more of said metals or their oxides, or of substances containing one or more of said metals or their oxides.

*Example 1.*—A mixture of one volume of phosphorus gas and 20 to 60 volumes of steam are fed at a temperature of 500 to 600° C. over a catalyzer, consisting of so-called palladium-asbestos containing about 25% by weight of palladium. A quantitative oxidation of the phosphorus into phosphorus pentoxide is obtained while a corresponding quantity of hydrogen is set free from the steam if the mixture of phosphorus gas and steam is supplied with a speed corresponding to a production of about 50 liters of hydrogen per hour and per gram of palladium in the catalyzer. The hydrogen produced contains only traces of hydrogen phosphide.

*Example 2.*—Pieces of pumice are soaked with a concentrated solution of ammonium molybdate and then heated in a current of hydrogen until the molybdate has been decomposed. The catalyzer thus manufactured is placed in a reaction chamber through which a mixture of one volume of phosphorus gas and 20 to 60 volumes of steam at a temperature of about 700° C. is supplied. A quantitative oxidation of the phosphorus into phosphorus pentoxide is obtained while a corresponding quantity of hydrogen is set free from the steam, if the mixture of phosphorus gas and steam is supplied with a speed corresponding to a production of about 150 liters of hydrogen per hour and per liter of the reaction chamber filled with the catalyzer. Also in this case the hydrogen produced is practically free from hydrogen phosphide.

*Example 3.*—Pieces of pumice are soaked with a solution of nickel nitrate and are then heated in a current of air until nickel oxide is formed. The catalyzer prepared in such manner is placed in a chamber, through which is led a mixture of one volume of phosphorus gas and 20 to 60 volumes of steam at a temperature of about 650° C. A quantitative oxidation of the phosphorus to phosphorus pentoxide is obtained while a corresponding quantity of hydrogen is set free from the steam, if the gas mixture is supplied with a speed corresponding to a production of about 200 liters of hydrogen per hour and per cubic decimeter of the chamber filled with catalyzer material. The hydrogen produced contains only traces of hydrogen phosphide.

*Example 4.*—Pieces of pumice are soaked with a solution of copper nitrate and are then heated to glowing temperature in a current of air. The catalyzer produced in this manner is placed in a reaction chamber through which is led a mixture of one volume of phosphorus gas and 20 to 60 volumes of steam at a temperature of 550 to 700° C. A quantitative conversion of the phosphorus into phosphorus pentoxide is obtained while a corresponding quantity of hydrogen is set free from the steam, if the gas mixture is supplied with a speed corresponding to a production of 250 liters of hydrogen per hour and per liter of the chamber filled with catalyzer material. The hydrogen produced contains only traces of hydrogen phosphide.

*Example 5.*—A catalyzer of very long durability is prepared in the following manner. Pieces of pumice are soaked with a solution of equal parts of nickel nitrate and copper nitrate and are then heated to glowing temperature in a current of air. Through a chamber filled with said catalyzer is led a mixture of one volume of phosphorus gas and 20 to 60 volumes of steam at a temperature of 550 to 700° C. A quantitative oxidation of the phosphorus to phosphorus pentoxide is obtained while a corresponding quantity of hydrogen is set free, if the gas mixture is supplied with a speed corresponding to a production of 250 liters of hydrogen per hour and per cubic decimeter of the chamber filled with catalyzer material. The hydrogen produced contains only traces of hydrogen phosphide.

*Example 6.*—A thin layer of cooper is deposited by electrolysis on a net of nickel wire. A reaction chamber is filled with plates of said coppered nickel nets and through it is supplied a mixture of one volume of phosphorus gas and 20 to 60 volumes of steam at a temperature of 550 to 700° C. A quantitative oxidation of the phosphorus to phosphorus pentoxide takes place while a corresponding quantity of hydrogen is set free from the steam, if the gas mixture is supplied with a speed corresponding to a production of about 400 liters of hydrogen per hour and per cubit decimeter of the chamber filled with said catalyzer. The hydrogen produced contains only traces of hydrogen phosphide.

*Example 7.*—Pieces of pumice are soaked with an ammoniacal solution of silver nitrate. The silver nitrate is then reduced by grape sugar, and the pieces are washed and dried. Through a chamber filled with the catalyzer thus produced a mixture of one volume of phosphorus gas and 20 to 60 volumes of steam at a temperature of 500 to 700° C. is supplied. A quantitative conversion of the phosphorus to phosphorus pentoxide is obtained while a corresponding quantity of hydrogen is set free, if the gas mixture is supplied with a speed corresponding to a production of about 150 liters of hydrogen per hour and per cubic decimeter of the chamber filled with catalyzer material. The gas produced contains only traces of hydrogen phosphide.

What we claim is:—

1. Method of producing hydrogen, consisting in reacting upon hydrogen phosphide by means of steam in the presence of a catalyzer at an elevated temperature at which the phosphorus of the hydrogen phosphide is oxidized by the oxygen of the water while the hydrogen of the water as well as that of the hydrogen phosphide is set free.

2. A method of producing hydrogen by reducing steam which comprises subjecting steam to the action of hydrogen phosphide at an elevated temperature while in the presence of a catalyst containing a metal included within that genius which includes the non-alkaline metals of the first group and the metals of the sixth to eigth groups of the periodic system.

3. A method of producing hydrogen by reducing steam at an elevated temperature which comprises reacting upon said steam with hydrogen phosphide in the presence of a catalyst containing a non-alkaline metal of the first group of the periodic system.

4. Process which comprises subjecting a mixture of phosphine and steam to a temperature of at least a dull red heat in the presence of a catalyst.

5. Process which comprises subjecting a mixture of air, steam and phosphine to a temperature of at least a dull red heat in the presence of a catalyst.

6. The process which comprises passing moist phosphine admixed with a free-nitrogen-containing gas through a heating zone into contact with a catalyst at above an incipient red heat.

7. The process which comprises passing moist phosphine admixed with a gas containing free nitrogen through a heating zone at about a red heat whereby hydrogen is liberated and an oxygenated compound of phosphorus is formed.

8. A process which comprises passing moist phosphoretted hydrogen admixed with a restricted amount of air through a heating zone at about a red heat whereby hydrogen is liberated and an oxygenated compound of phosphorus is formed.

9. A process of oxidizing phosphine, which comprises passing a mixture containing phosphine and water vapor in contact with a catalyst, at a temperature at which the phosphine is oxidized by said water vapor.

10. A process of oxidizing phosphine which comprises passing a mixture containing phosphine and water vapor in contact with a catalyst, at a temperature at which free hydrogen is produced.

11. Process which comprises subjecting a mixture of phosphine and steam to a temperature of at least a dull red heat.

12. Process which comprises subjecting a mixture of air, steam and phosphine to a temperature of at least a dull red heat.

In testimony whereof we hereto affix our signatures.

FRANS G. LILJENROTH.
MARKUS LARSSON.